United States Patent
Baier et al.

(10) Patent No.: US 10,715,355 B2
(45) Date of Patent: Jul. 14, 2020

(54) PROCESSING MODULE FOR A COMMUNICATION DEVICE AND METHOD THEREFOR

(71) Applicant: NXP B.V.

(72) Inventors: Thomas Baier, Graz (AT); Wolfgang Küchler, Graz (AT); Frank Leong, Veldhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/611,014

(22) Filed: Jun. 1, 2017

(65) Prior Publication Data
US 2017/0359134 A1 Dec. 14, 2017

(30) Foreign Application Priority Data
Jun. 8, 2016 (EP) ..................................... 16173522

(51) Int. Cl.
*G01S 5/02* (2010.01)
*H04J 3/06* (2006.01)
(Continued)

(52) U.S. Cl.
CPC ........ *H04L 25/0202* (2013.01); *G01S 5/0215* (2013.01); *G01S 13/765* (2013.01);
(Continued)

(58) Field of Classification Search
CPC ....... H04L 7/042; H04L 7/043; H04L 9/3236; H04L 25/0202; H04L 25/0224
See application file for complete search history.

(56) References Cited

U.S. PATENT DOCUMENTS 6,453,168 B1 * 9/2002 McCrady ................ G01S 5/021
342/457
7,149,239 B2 12/2006 Hudson
(Continued)

FOREIGN PATENT DOCUMENTS

CN 101883426 A 11/2010
CN 103138800 A 6/2013
(Continued)

OTHER PUBLICATIONS

IEEE Computer Society "IEEE Standard for Low-Rate Wireless Personal Area Networks (WPANs)", IEEE Std 802.15.4™ (Revision of IEEE Std 802.15A-2011), 709 pgs. (2015).
(Continued)

*Primary Examiner* — Kevin C. Harper
(74) *Attorney, Agent, or Firm* — Rajeev Madnawat

(57) ABSTRACT

A processing module for a receiver device. The processor module comprises a channel estimate generation component arranged to output channel estimate information for a received signal, and a timestamping module arranged to determine a ToA measurement for a marker within a packet of the received signal based at least partly on the channel estimate information for the received signal generated by the channel estimate generation component. The channel estimate generation component comprises a validation component arranged to derive a validation pattern for the packet within the received signal for which a ToA measurement is to be determined, identify a section of the packet containing a validation sequence, and perform cross-correlation between at least a part of the validation sequence within the packet and at least a part of the generated validation pattern to generate channel estimate validation information.

15 Claims, 11 Drawing Sheets

(51) Int. Cl.
*H04L 7/04* (2006.01)
*H04L 9/32* (2006.01)
*H04L 25/02* (2006.01)
*G01S 13/76* (2006.01)

(52) U.S. Cl.
CPC ........ *H04L 9/3236* (2013.01); *H04L 25/0224* (2013.01); *H04J 3/0608* (2013.01); *H04L 7/043* (2013.01); *H04L 25/0212* (2013.01)

(56) References Cited

U.S. PATENT DOCUMENTS

| | | | |
|---|---|---|---|
| 8,155,168 B2 | 4/2012 | Thijs et al. | |
| 8,472,500 B2 | 6/2013 | Marton | |
| 9,091,746 B2 | 7/2015 | Fischer et al. | |
| 9,915,724 B2 | 3/2018 | Amizur et al. | |
| 10,298,337 B2 | 5/2019 | Kuchler et al. | |
| 2003/0043887 A1 | 3/2003 | Hudson | |
| 2009/0046792 A1 | 2/2009 | Xu et al. | |
| 2010/0135178 A1 | 6/2010 | Aggarwal et al. | |
| 2010/0226463 A1* | 9/2010 | Wang | H04L 7/042 375/343 |
| 2010/0260207 A1* | 10/2010 | Simmons | G01S 5/14 370/503 |
| 2015/0349917 A1* | 12/2015 | Skaaksrud | G06Q 10/0833 370/328 |
| 2016/0234684 A1* | 8/2016 | Hekstra | H04K 1/02 |
| 2016/0350987 A1 | 12/2016 | Zivkovic et al. | |
| 2017/0013403 A1* | 1/2017 | Sen | H04B 17/27 |

FOREIGN PATENT DOCUMENTS

| | | |
|---|---|---|
| CN | 104243064 A | 12/2014 |
| DE | 601 02 616 T2 | 3/2005 |
| DE | 60102616 T2 | 3/2005 |
| EP | 3 255 851 A1 | 12/2017 |
| WO | 2013/070275 A1 | 5/2013 |
| WO | 2016/019354 A1 | 2/2016 |

OTHER PUBLICATIONS

Poturalski, M. et al. "The Cicada Attack: Degradation and Denial of Service in IR Ranging", IEEE International Conference on Ultra-Wideband, Nanjing, pp. 1-4 (2010).

Poturalski, M. et al. "On Secure and Precise IR-UWB Ranging", IEEE Transactions on Wireless Communications, vol. 11, No. 3, pp. 1087-1099 (Mar. 2012).

Flury et al "Effectiveness of Distance-Decreasing Attacks Against Impulse Radio Ranging", 3rd ACM Conference on Wireless Network Security, pp. 117-128 (2010).

Non-Final Office Action dated May 17, 2018 for U.S. Appl. No. 15/697,073 15 pgs.

Final Office Action dated Sep. 7, 2018 for U.S. Appl. No. 15/697,073 20 pgs.

Poturalski, M. et al. "Distance Bounding with IEEE 802.15.4a: Attacks and Countermeasures", IEEE Transactions on Wireless Communications, vol. 10, No. 4, pp. 1334-1344 (2011).

Non-Final Rejection for U.S. Appl. No. 16/360,945 9 pgs. (dated Jan. 2, 2020).

Notice of Allowance for U.S. Appl. No. 15/697,073 9 pgs. (dated Mar. 20, 2019).

Liang, W.-B. et al. "A Time Delay Estimation Algorithm Based on MIMO", China Academic Journal Electronic Publishing House, Computer Engineering, vol. 40, No. 1, 6 pgs. (Jan. 2014).

Final Rejection for U.S. Appl. No. 16/360,945 7 pgs. (dated May 11, 2020).

Notice of Allowance for U.S. Appl. No. 16/360,945, 5 pgs. (dated May 20, 2020).

* cited by examiner

PROCESSING MODULE FOR A COMMUNICATION DEVICE AND METHOD THEREFOR

CROSS-REFERENCE TO RELATED APPLICATIONS

This application claims the priority under 35 U.S.C. § 119 of European Patent application no. 16173522.0, filed on Jun. 8, 2016, the contents of which are incorporated by reference herein.

FIELD OF THE INVENTION

This invention relates to a processing module for a communication device and a method therefor of estimation of a propagation channel model.

BACKGROUND OF THE INVENTION

Wideband Radio Frequency (RF) applications have been developed that are capable of accurate distance measurement between two or more wireless devices. These measurements are based on Time-of-Flight (ToF) calculations which are derived by accurate determination of departure and arrival times of RF packets between two devices. RF packets travel at the speed of light and thus a calculated ToF allows determination of the distance between devices. Such a procedure is commonly called 'Ranging'. One practical application of Ranging is 'Distance Bounding' whereby ToF calculations are used to verify whether the distance between two devices is less than a predefined threshold, such as used for automotive Passive Keyless Entry (PKE) systems and other access control systems, as well as for contactless electronic payment systems.

FIG. 1 illustrates the principle of calculating the ToF between two devices, A and B, using Time-of-Arrival (ToA) and Time-of-Departure (ToD) measurements for RF packets transmitted there between. The procedure starts with Device A transmitting a 'Request' packet to Device B with a measured ToD ($t_{todA}$). Upon receipt of the Request packet, Device B measures the ToA ($t_{toaB}$) and transmits a 'Response' packet back to Device A with a measured (or predetermined) ToD ($t_{todB}$). Upon receipt of the Response packet, Device A measures the ToA of the Response packet ($t_{toaA}$). From the measured (or otherwise derived) ToDs and ToAs, a roundtrip duration ($Trtt=t_{todA}-t_{toaA}$) and a response duration ($T_{rsp}=t_{toaB}-t_{todB}$) can be calculated. The ToF between the devices A and B may then be estimated from the roundtrip duration and response duration: $ToF=0.5*(T_{rtt}-T_{rsp})$.

In a multipath environment, the ToAs for the most direct (shortest) path, i.e. the 'Line-of-Sight' (LoS) path, between the two devices should be measured and used for accurately calculating the distance between two devices. Accordingly, the first arriving path for the respective RF packet needs to be found. In order to enable a receiving device to identify the first arriving path for an RF packet, the receiving device derives a channel estimate to describe the multipath environment. FIG. 2 illustrates an example of such a channel estimate, with the first non-zero tap, such as indicated at 200 in FIG. 2, typically representing the first path within the multipath environment between the two devices. Significantly, the LoS path signal may not be the strongest signal received by the receiver, for example when a blocking object is located directly between the transmitting device and the receiving device. As such, the tap 200 within the channel estimate representing the LoS path may not have the highest amplitude within the channel estimate. Accordingly, the LoS path within a multipath environment is conventionally found by identifying the first non-zero tap within the channel estimate.

A receiving device is able to derive a channel estimate in relation to a transmitting device using known patterns within a received packet from the transmitting device. For example, in IR-UWB (Impulse Radio-Ultra-WideBand) systems, such as defined in IEEE 802.15.4, a preamble comprising repeating synchronisation symbols and a Start-of-Frame Delimiter (SFD) is placed in front of a payload segment. In IR-UWB receivers, the repeating synchronisation symbols within the preamble of a received packet are typically used to derive a channel estimate for the received packet.

However, conventional approaches to identifying the LoS path for a multi-channel environment are susceptible to 'attacks' that can result in a false 'first' path being detected, and thus an incorrect (early) ToA measurements being taken. One example of such an attack is known as the 'Cicada' attack, as described in "The Cicada Attack: Degradation and Denial of Service in IR Ranging"; Marcin Poturalski, Manuel Flury, Panos Papadimitratos, Jean-Pierre Hubaux, Jean-Yves Le Boudec; 2010 IEEE International Conference on Ultra-Wideband. A Cicada attack is employed by an 'illegitimate' transmitter blindly transmitting a sequence of pulses. If the adversarial pulse rate matches the symbol rate used by a receiver of the legitimate signal to derive a channel estimate, then the adversarial pulses will affect the channel estimate derived by the receiver. Since these adversarial pulses are unsynchronised with the legitimate transmitted signal, they will be time-shifted randomly with respect to symbols being transmitted within the legitimate signal. Accordingly, there is a likelihood that for some of the symbols transmitted within the legitimate signal the adversarial pulses will induce a sporadic illegitimate LoS path located ahead of the legitimate LoS path within the channel estimate derived by the receiving device, and thus cause a false first path to be detected and an early ToA measurement to be taken. By causing an early ToA measurement to be taken, the subsequent ToF calculation will be based on the early ToA measurement, resulting in a shortened ToF to be calculated, which in turn will result in a shortened distance between the legitimate transmitter device and receiver device to be estimated. Since there is no synchronization to the legitimate signal, the actual distance gain is hard to predict. However in many scenarios the attacker does not need to succeed in the first attempt. Significantly, the attacking device only requires knowledge of the symbol period used for deriving the channel estimate to employ the Cicada attack, information which is often publically available, for example defined within standards etc.

A more sophisticated attack is described in "Effectiveness of Distance-Decreasing Attacks Against Impulse Radio Ranging"; Manuel Flury, Marcin Poturalski, Panos Papadimitratos, Jean-Pierre Hubaux, Jean-Yves Le Boudec; 3rd ACM Conference on Wireless Network Security, 2010. In this attack, the attacking device synchronises to the legitimate signal first, and then transmits the adversarial sequence of pulses with a specific timing offset. In this manner, the attacking device is able to control the relative timing of the adversarial sequence of pulses with respect to the legitimate signal. As a result, the attacking device is able to control where the adversarial pulses will be located within the channel estimate derived by the receiving device, and thus control how much of a distance gain is achieved. Significantly, since the synchronisation symbols are in many cases used for deriving the channel estimate within a receiving device, the attacking device only requires knowledge of the synchronisation symbol pattern and symbol period to employ this second attack.

SUMMARY OF THE INVENTION

The present invention provides a processor module for a communication receiver device, a corresponding communication receiver device, a processor module for a communication transmitter device, a corresponding communication transmitter device and a method for generating channel estimate information as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

According to example embodiments, there are provided processing modules for transmitter and receiver devices arranged to transmit and receive respectively a signal comprising a packet having therein a validation sequence. The validation sequence enables the receiver device to validate channel estimate information for the transmission channel between the two devices, thereby enabling ToA attacks such as Cicada attacks and (a)synchronous preamble injection attacks to be mitigated and detected.

Example embodiments are herein described with reference to a radio frequency (RF) communication device. However, it is contemplated that embodiments are not limited to being implemented solely within RF communication devices and embodiments may be applicable to any system in which ToA measurements are required to be determined, and is particular applicable to any system in which a Time-of-Flight (ToF) distance measurement is a specified function, such as IR-UWB (Impulse Radio-Ultra WideBand) radio frequency (RF) transceivers, pulse radars at 60 GHz and higher frequencies, and pulse-based light/laser ranging transceivers. Thus it is contemplated that embodiments may be implemented within a range of different communication systems including, but not limited to, RF communication systems, optical (e.g. light/laser) communication systems, sound-based communication systems, etc. The applications may range from automotive Passive Keyless Entry (PKE) systems and other access control systems to (contactless) electronic payment systems, and in particular to any application where ranging and distance bounding is performed.

Figure 1:
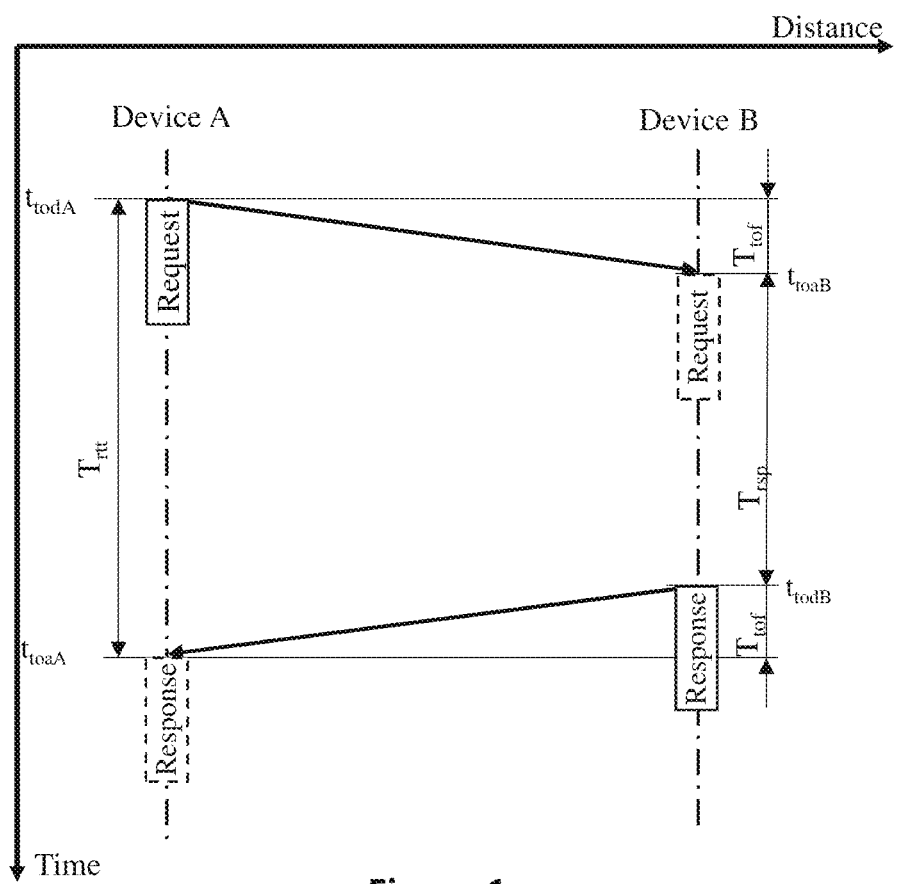
FIG. 1 illustrates the principle of calculating the ToF between two devices.
Figure 2:
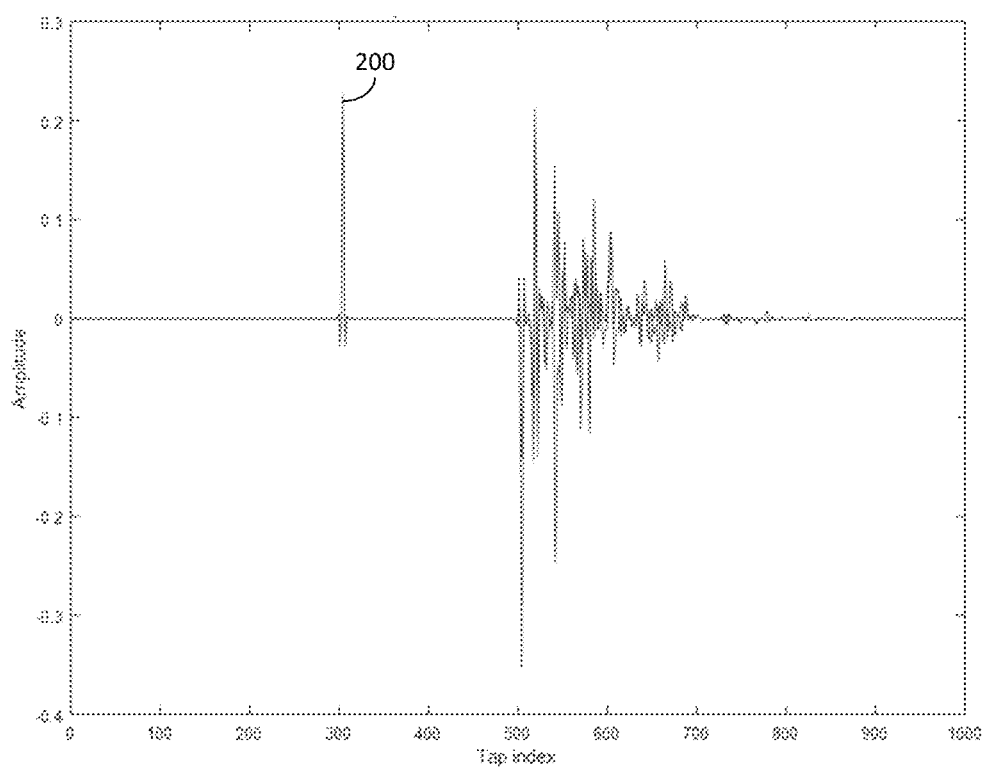
FIG. 2 illustrates an example of such a channel impulse response.
Figure 3:
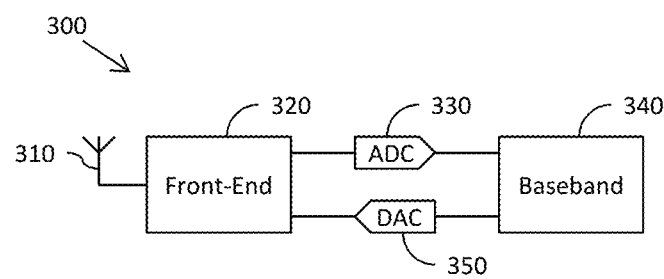
FIG. 3 illustrates a simplified block diagram of an example of part of a wireless radio frequency (RF) device.

Referring now to FIG. 3, there is illustrated a simplified block diagram of an example of part of a wireless radio frequency (RF) communication device 300. The communication device 300 includes an antenna 310 for receiving and transmitting RF signals over an air interface. The antenna 310 is coupled to front-end circuity 320. The front-end circuit 320 typically consists of a receive path including, for example, a low noise amplifier, mixer and band-pass filter, and a transmit path including, for example, a mixer, filter and power amplifier. The receive path of the front-end circuit 320 is coupled to a baseband processing module 340 of the communication device 300 via an analogue-to-digital converter (ADC) 330, via which received signals are passed from the front-end circuit 320 to the baseband processing module 340. The transmit path of the front-end circuit 320 is coupled to the baseband processing module 340 via a digital-to-analogue converter (DAC) 350, via which signals to be transmitted are passed from the baseband processing module 340 to the front-end circuit 320.

Figure 4:
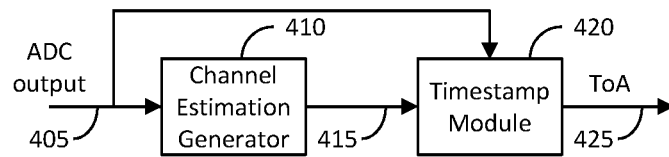
FIG. 4 illustrates a simplified block diagram of a part of a baseband processing module.

According to some example embodiments, the baseband processing module 340 of the communication device 300 is arranged to perform Time-of-Arrival (ToA) measurements on data packets within received RF signals. FIG. 4 illustrates a simplified block diagram of a part of the baseband processing module 340 arranged to perform ToA measurements on received data packets. A channel estimate generator component 410 is arranged to receive the digital representation of the received RF signal 405 output by the ADC 330 and to generate channel estimate information 415 for a multipath transmission channel between the communication device 300 and a transmitter device from which the received RF signal is being transmitted. A timestamp module 420 is arranged to receive the channel estimate information 415 generated by the channel estimate generation component 410, and the digital representation of the received RF signal 405, and to determine a ToA measurement 425 for a marker within a packet within the received RF signal based at least partly on the channel estimate information 415. For example, a signal received via a multipath channel will comprise a plurality of multipath components. The timestamp module 420 may be arranged to identify a Line-of-Sight (LoS) component of the received signal based on the channel estimate information 415, and to determine a ToA measurement 425 for a marker within the packet for the LoS component of the received signal.

Figure 5:
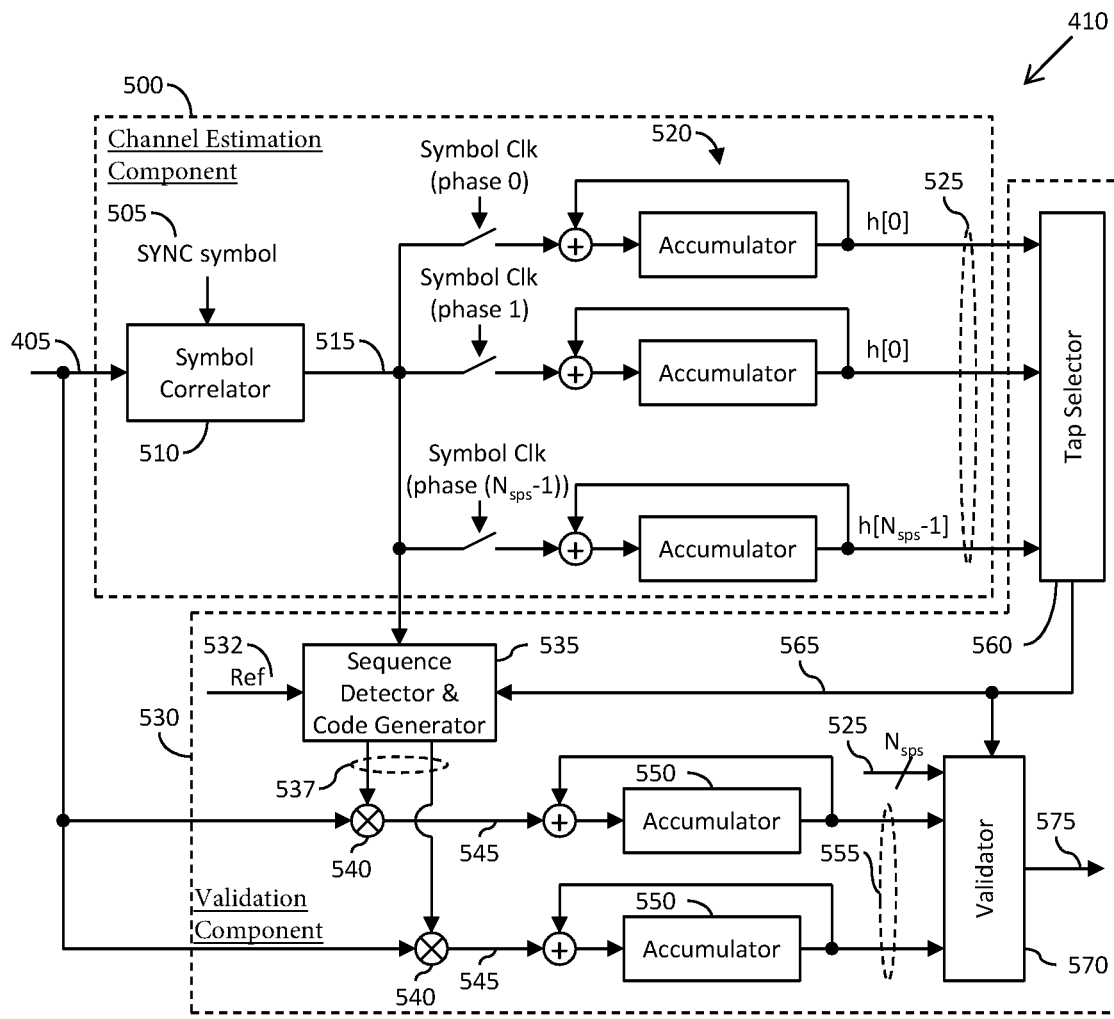
FIG. 5 illustrates a simplified block diagram of an example of a channel estimate generation component.

FIG. 5 illustrates a simplified block diagram of an example of the channel estimate generation component 410. For the example illustrated in FIG. 5, the channel estimate generation component 410 comprises a channel estimation component 500. The channel estimation component 500 including a symbol correlator 510 arranged to receive the digital representation of the received RF signal 405 output by the ADC 330, and to perform cross-correlation of the received signal 405 with a reference pattern, which in the illustrated example consists of a synchronisation symbol 505, and to output a resulting correlation signal 515. The correlation signal 515 output by the symbol correlator 510 is fed to a plurality of accumulator circuits, indicated generally at 520 via switches, the switches being controlled such that each accumulator circuit 520 is arranged to receive the correlation signal 515 output by the symbol correlator 510 at a specific phase within each successive correlation window. In this manner, each accumulator circuit 520 is arranged to accumulate a symbol correlation value h[i] for a received signal corresponding to a particular multipath component of the transmission channel, with the combined symbol correlation values h[0] to h[$N_{sps}$−1], $N_{sps}$ defining the number of samples per symbol, forming (unvalidated) channel estimate information 525 for the multipath transmission channel output by the channel estimation component 500, whereby each symbol correlation value h[i] comprises a channel estimate tap value within the (unvalidated) channel estimate information 525 for the multipath transmission channel.

The channel estimate generation component 410 further includes a validation component 530. The validation component 530 in the example illustrated in FIG. 5 is arranged to receive a validation pattern reference 532 for a packet for which a ToA is to be determined, generate a validation pattern based at least partly on the validation pattern reference 532, identify a section within the packet comprising a validation sequence, and perform cross-correlation between at least a part of the validation sequence within the packet and at least a part of the generated validation pattern to generate validated channel estimate information.

Significantly, the validation pattern generated (or otherwise derived) by the validation component 530 is required to correspond to the validation sequence within the received packet. Accordingly, the validation pattern reference 532 is required to be known by both the transmitting device and the receiving device. To mitigate the attacks identified in the background of the invention, it is contemplated that the validation pattern and validation sequence be unknown and not predictable for an attacker. This can be achieved using Cryptographically-Secure Pseudo-Random-Number-Generators (CSPRNG) where a validation pattern reference 532 in the form of a seed is mutually agreed by, for example, a challenge/response scheme between the legitimate transmitter and receiver devices. In some alternative embodiments, the validation pattern reference 532 may comprise the validation pattern itself. The validation sequence(s) may also be sufficiently long to avoid guessing attacks and to provide good autocorrelation (low side-lobes) properties. The hardware effort can be kept low by maintaining existing synchronization mechanisms. The validation sequences are then applied after the receiver is already synchronized (either by providing the validation sequence(s) in the same packet, or within succeeding packets). In addition, it is contemplated that a non-repeating-symbol validation pattern (i.e. a validation pattern comprising no repeating symbols) be used. By avoiding repeatable symbols within the validation sequence(s), cicada attacks may be further mitigated A secure and non-predictable validation pattern used to form the validation sequence may be achieved by using, for example, a Cryptographically-Secure Pseudo-Random Number Generator (CSPRNG) to generate a time-varying validation pattern. For the example illustrated in FIG. 5, the sequence detector and code generator component 535 may comprise a CSPRNG and the validation pattern reference 532 may thus comprise a seed value, also known to the transmitting device, used by the CSPRNG of the sequence detector and code generator component 535 to generate the validation pattern.

Figure 6:
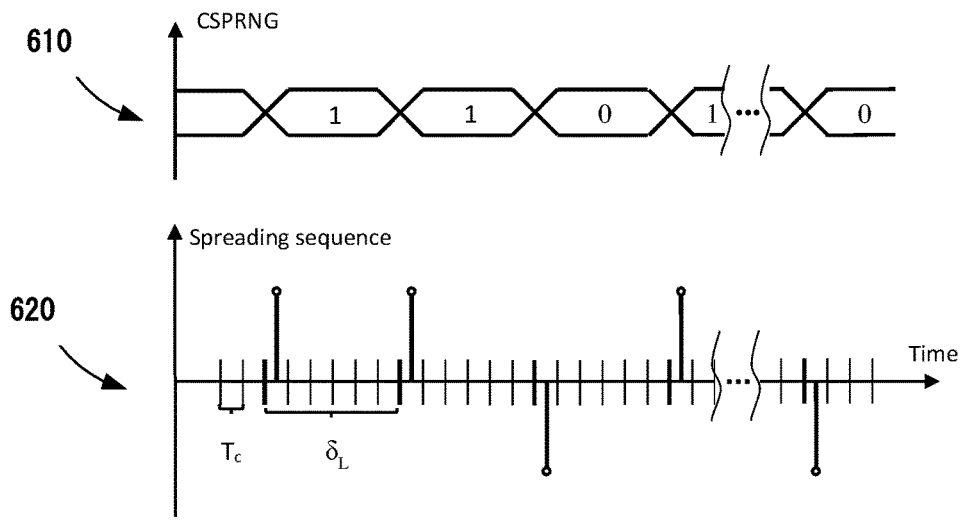
FIGS. 6 to 8 illustrate examples of validation patterns and corresponding validation sequences within IR-UWB packets.

FIG. 6 illustrates an example of a validation pattern 610 and corresponding validation sequence 620 within a IR-UWB packet. Compared to ordinary Direct-Sequence Spread Spectrum (DSSS), IR-UWB according to IEEE 802.15.4 defines a certain up-sampling factor δL which is used to derive a specific average Pulse Repetition Frequency (PRF). For IR-UWB applications, a CSPRNG can also be used to generate pseudo-random time-hopping positions for each pulse and/or validation code interleaving sequences for each pulse. The generation of code and time-hopping positions may be provided by one single CSPRNG or by separate generators.

Figure 7:
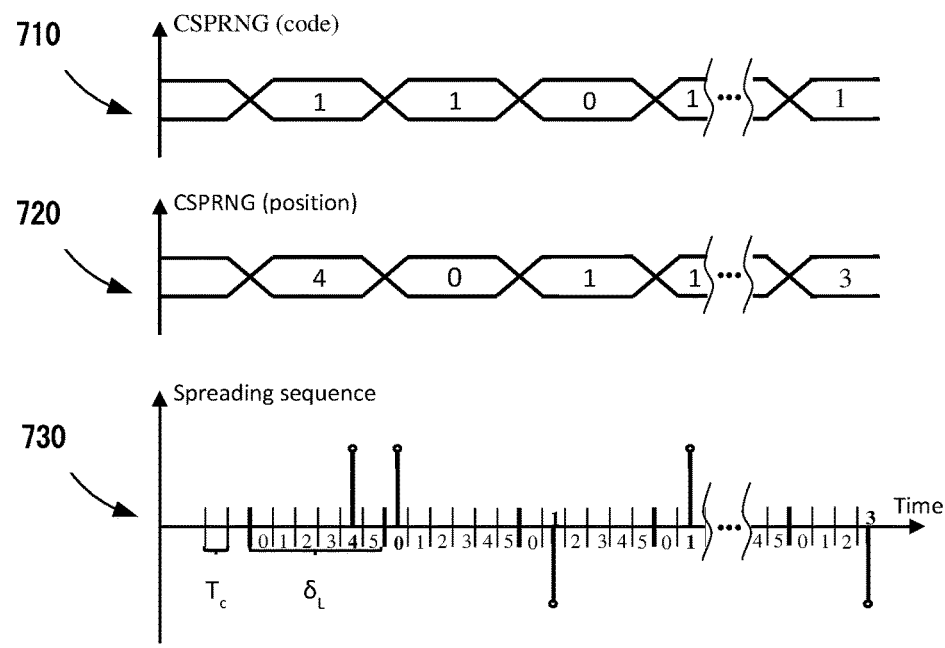

An example of code and time-hopping position generation suitable for IR-UWB applications can be seen in FIG. 7. Varying time-hopping may be used for non-coherent receivers or for further mitigation of Cicada attacks in coherent receivers since then the PRF is not static within the sequence and an attacker is not able to continuously hit a non-zero tap of the spreading code. For the example illustrated in FIG. 5, the sequence detector and code generator component 535 would thus be arranged to generate a validation code pattern, such as illustrated at 710, and also a validation code position pattern, such as illustrated at 720 for performing cross-correlation with the validation sequence within the packet illustrated at 730. Thus, it is contemplated that the generated validation pattern may comprise a validation code pattern 710, a validation code position pattern 720 and/or a validation code interleaving sequence.

Figure 8:
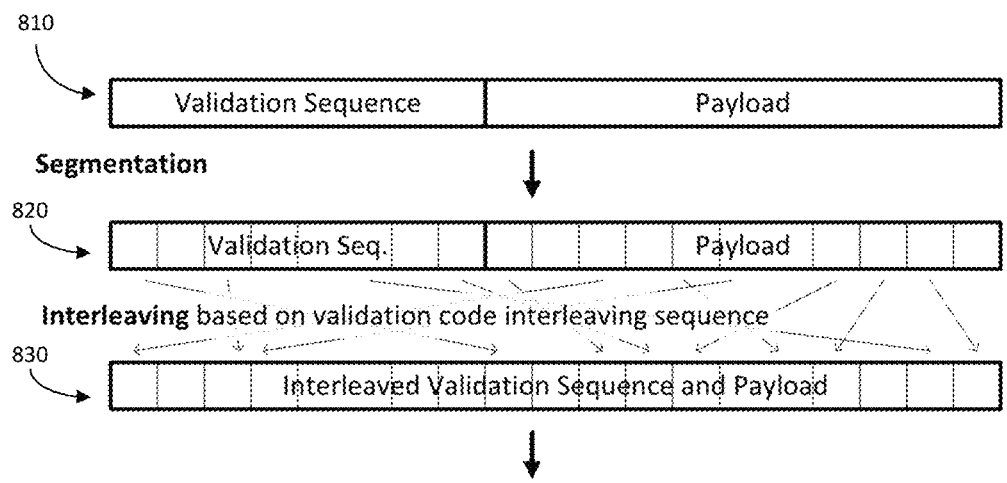

An example of a validation code interleaving sequence is illustrated in FIG. 8. The validation sequence and payload 810 are first segmented. Interleaving of the segmented validation sequence and payload 820 are is then performed to generated an interleave validation sequence and payload packet 830.

In addition to an ordinary Pseudo-Random Number Generator which focuses on statistical randomness, a CSPRNG provides additional properties to make it very difficult to predict future validation patterns by observation of the current and past validation sequences within packets or to determine the inner state of the validation pattern generator. Alternatively examples of algorithms that may be used to generate the validation pattern include, for example, hash functions etc. Thus it is contemplated that the validation pattern may be generated based on one or more of:

A pseudo random number generator function;
A cryptically secure pseudo random number generator function;
A hash function; and
A secure hash function.

Before a secure validation pattern can be employed, the legitimate transmitter and receiver devices need to agree on the specific validation pattern(s). This can either be done by transmitting the complete validation pattern(s) over a secure (encrypted) channel or by simply exchanging the reference value 532 for generating the validation pattern.

Figure 9:
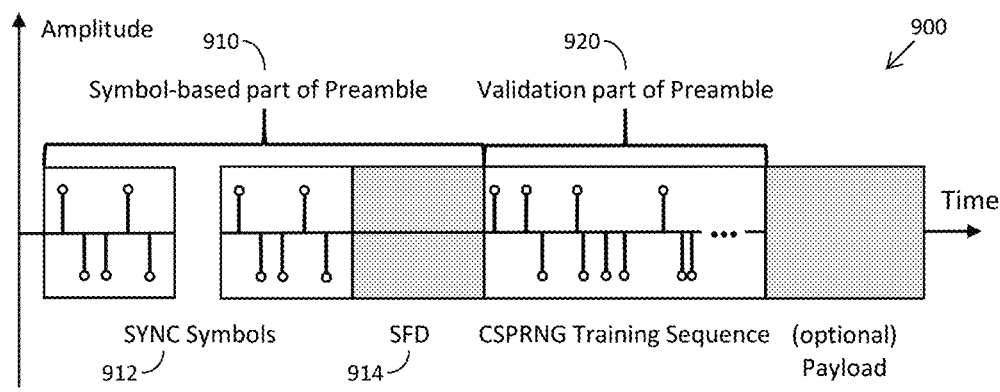
FIG. 9 illustrates an example of a packet structure.

FIG. 9 illustrates one example of a packet structure 900 according to some example embodiments. In the example illustrated in FIG. 9, a preamble of the packet 900 consists of a symbol-based section 910 followed by a validation section 920. For the example illustrated in FIG. 9, the symbol-based section 910 consists of a series of synchronisation symbols 912 followed by a Start of Frame Delimiter (SFD) 914. By providing the series of synchronisation symbols 912 at the start of the preamble in this manner, a receiver device is able to synchronise with an incoming packet, with the SFD 914 signalling the end of the series of synchronisation symbols 912. Furthermore, the series of synchronisation symbols 912 enable initial (unvalidated) channel estimate information to be generated for the packet. The validation section 920 of the preamble contains a validation sequence.

Referring back to FIG. 5, upon receipt of a packet 900 as illustrated in FIG. 9, the channel estimate generation component 410 is able to synchronise with the received signal 405 and to generate initial (unvalidated) channel estimate information 525 using the synchronisation symbols 912 within the first part of the preamble 910. A sequence detector and code generator component 535 of the validation component 530 is arranged to receive the validation pattern reference 532 for the packet being received and to generate a validation pattern based on the received validation pattern reference 532. The sequence detector and code generator component 535 is further arranged to detect when a validation sequence 920 within a packet is to be received, for example upon detection of the SFD 914 within the packet structure 900 illustrated in FIG. 9. The sequence detector and code generator component 535 may then cause cross-correlation to be performed between the validation sequence within the packet and the generated validation pattern to generate channel estimate validation information 555.

For the example illustrated in FIG. 5, the validation component 530 further comprises correlator circuits comprising multiplier components 540 and accumulator circuits 550. Each multiplier component 540 is arranged to receive the digital representation of the received RF signal 405 output by the ADC 330 and a correlation coefficient 537 output by the sequence detector and code generation component 535, perform cross-correlation of the received signal 405 and respective correlation coefficient 537 and to output a resulting correlation signal 545 to the respective accumulator circuit 550. The sequence detector and code generation component 535 is arranged to sequentially configure the correlation coefficient 537 output to each multiplier component 540 based on the generated validation pattern and on a delay of a multipath component of the transmission channel.

In the example illustrated in FIG. 5, the validation component 530 further comprises a tap selector 560 arranged to select one or more channel estimate taps to be validated, and provide an indication 565 of the selected taps to the sequence detector and code generation component 535. For example, and as illustrated in FIG. 5, the tap selector 560 receives the (unvalidated) tap values 525 output by the channel estimation component 500 and selects one or more channel estimate taps to be validated. For example, the tap selector 560 may select the first tap within the channel estimate for which the corresponding tap value 525 has a magnitude greater than a threshold, e.g. the first non-zero tap, such tap being indicative of a LoS path. The tap selector 560 may additionally/alternatively select one or more channel estimate taps having the highest magnitude value(s), etc. In the example illustrated in FIG. 5, the tap selector 560 is arranged to select two taps, for example a first non-zero tap within the channel estimate, and a tap having the highest magnitude tap value 525. The tap selector 560 provides an indication 565 of the selected taps to the sequence detector and code generator component 535. The sequence detector and code generator component 535 is then arranged to configure a delay for a first multiplier component 540 in accordance with the first selected tap, and to configure a delay for a second multiplier component 540 in accordance with the second selected tap. The sequence detector and code generator component 535 then sequentially configures the validation coefficients 537 for the multiplier components 540 based on the generated validation pattern and the respective delays configured therefor.

Figure 10:
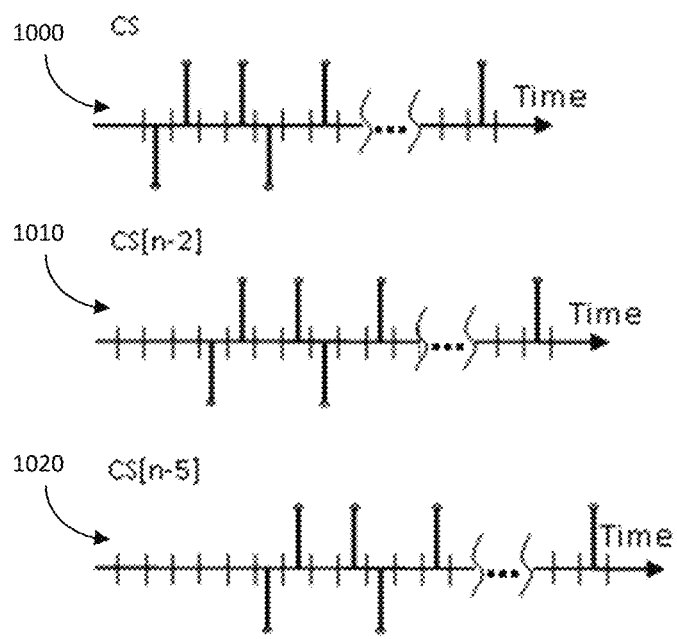
FIG. 10 illustrates a timing diagram showing an example of the sequential configuration of the validation coefficients.

FIG. 10 illustrates a timing diagram showing an example of the sequential configuration of the validation coefficients 537. An example of a part of a validation pattern generated by the sequence detector and code generator component 535 is illustrated at 1000. A first validation coefficient sequence is illustrated at 1010. This first validation coefficient sequence 1010 has been configured to follow the validation pattern 1000 but with a delay such that the timing of the validation pattern within the first validation coefficient sequence 1010 matches the timing of the validation sequence with the received signal 405 for the first selected channel estimate tap. Similarly, a second validation coefficient sequence is illustrated at 1020. This second coefficient sequence 1020 has been configured to follow the validation pattern 1000 but with a delay such that the timing of the validation pattern within the second validation coefficient sequence 1020 matches the timing of the validation sequence within the received signal 405 for the second selected channel estimate tap.

Referring back to FIG. 5, by configuring the validation coefficients 537 in this manner, the sequence detector and code generator component 535 is arranged to configure the multiplier components 540 to perform cross-correlation of the validation sequence within the received signal 405 and the generated validation pattern in relation to the selected channel estimate taps, and to output resulting correlation signals 545 for the selected channel estimate taps.

The correlation signal 545 output by each multiplier component 540 is fed to the validation accumulator circuit 550 within the respective correlator circuit. In this manner, each validation accumulator circuit 550 of the validation component is arranged to accumulate a validation pattern correlation value for the received signal 405 corresponding to a selected tap for the multipath transmission channel. The validation pattern correlation values accumulated by the validation accumulator circuits 550 thus provide the channel estimate validation information 555 for the selected taps.

Thus, for the example illustrated in FIG. 5, the validation component 530 is arranged to receive the unvalidated channel estimate information 525 output by the accumulator circuits 520 in relation to, for example, synchronisation symbols 912 within a first part 910 (FIG. 9) of the preamble of a received packet, select (by way of the tap selector 560) one or more tap(s) for which channel estimate validation information is to be generated, and perform cross-correlation (by way of the multiplier components 540 and accumulators 550) between the validation sequence 920 within the packet and the generated validation pattern 700 (FIG. 7) to generate channel estimate validation information 555 for the selected channel estimate tap(s).

The validation component 530 may further be arranged to determine whether the unvalidated channel estimate information 525 for the selected channel estimate tap(s) is valid based on the generated channel estimate validation information 555, and to output 575 an indication of whether the unvalidated channel estimate information 525 for the selected channel estimate tap(s) is valid based on said determination. For example, and as illustrated in FIG. 5, the channel estimate validation information 555 may be provided to a validator component 570. The validator component 570 may also be arranged to receive the unvalidated channel estimate information 525 and the indication 565 of the selected taps. The validator component 570 may then perform a comparison of the unvalidated channel estimate information 525 for each of the selected taps to the corresponding channel estimate validation information 555, and determine whether the unvalidated channel estimate information 525 for each of the selected taps is valid. Accordingly, the channel estimate information 415 (FIG. 4) provided to the timestamp module 420 may consist of the channel estimate information 525 consisting of the unvalidated channel estimate tap values and/or the indication 575 of whether the channel estimate information 525 consisting of the unvalidated channel estimate tap values for the selected channel estimate tap(s) is valid.

In some alternative embodiments, the validator component 570 may be arranged to replace unvalidated tap values 525 for the selected taps with validated tap values 555 for the selected taps output by the validation accumulator circuits 555, and to generate and output 575 validated channel estimate information consisting of the validated tap values 555 for the selected taps and unvalidated tap values 525 for non-selected taps.

The tap values 525 received by the tap selector 560 and based on which the tap selector 560 selects one or more taps may relate to, for example, preceding synchronisation symbols 912 with the same packet as the validation sequence for which cross-correlation is to be performed, as described above in relation to the packet 900 illustrated in FIG. 9. However, it is contemplated that in some example embodiments, the tap values 525 based on which the tap selector 560 selects one or more taps may relate may alternatively relate to a preceding packet within the received signal.

Figure 11:
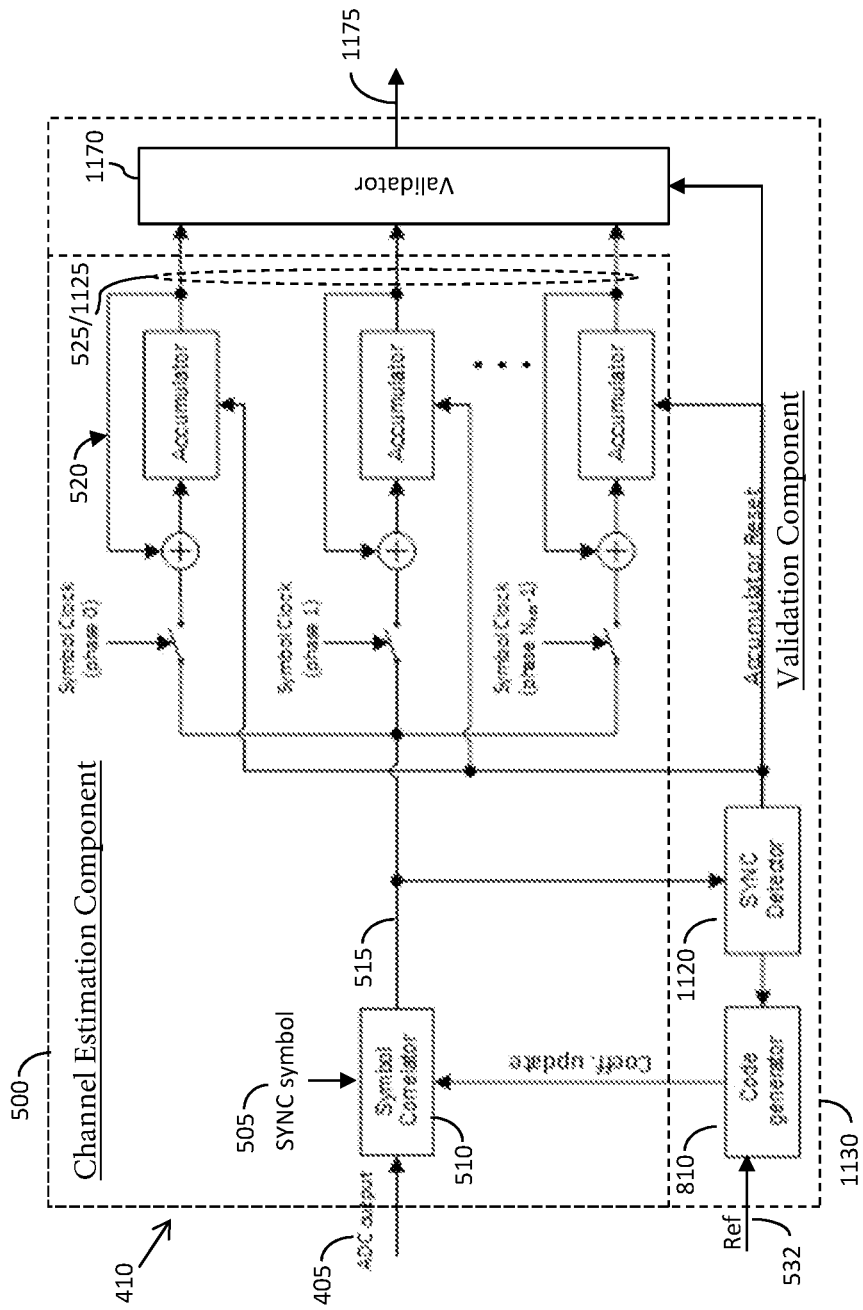
FIG. 11 illustrates a simplified block diagram of an alternative example of a channel estimate generation component.

FIG. 11 illustrates a simplified block diagram of an alternative example of the channel estimate generation component 410. For the example illustrated in FIG. 11, the channel estimate generation component 410 also comprises a channel estimation component 500. The channel estimation component 500 including a symbol correlator 510 arranged to receive the digital representation of the received RF signal 405 output by the ADC 330, and to perform cross-correlation of the received signal 405 with a reference pattern, for example a synchronisation symbol, and to output a resulting correlation signal 515. The correlation signal 515 output by the symbol correlator 510 is fed to a plurality of accumulator circuits, indicated generally at 520 via switches, the switches being controlled such that each accumulator circuit 520 is arranged to receive the correlation signal 515 output by the symbol correlator 510 at a specific phase within each successive correlation window. In this manner, each accumulator circuit 520 is arranged to accumulate a symbol correlation value h[i] for a received signal corresponding to a particular multipath component of the transmission channel, with the combined symbol correlation values h[0] to h[$N_{sps}$−1] forming channel estimate information 525/825 for the multipath transmission channel output by the channel estimation component 500, whereby each symbol correlation value h[i] comprises a channel estimate tap value within the channel estimate information 525/825 for the multipath transmission channel.

The channel estimate generation component 410 illustrated in FIG. 11 includes a validation component 1130. The validation component 1130 is arranged to receive a validation pattern reference 532 for a packet for which a ToA is to be determined, generate a validation pattern based at least partly on the validation pattern reference 532, identify a section within the packet comprising a validation sequence, and perform cross-correlation between at least a part of the validation sequence within the packet and at least a part of the generated validation pattern to generate validated channel estimate information. As for the example illustrated in FIG. 5, the validation pattern reference 532 may be in the form of a seed from which the validation pattern is derived, or in some alternative embodiments may comprise the validation pattern itself.

Upon receipt of a packet, for example comprising the packet 800 illustrated in FIG. 8, the symbol correlator 510 may initially be configured to perform cross-correlation of the received signal 405 with a reference pattern consisting of the synchronisation symbol 505 within the first part of the packet preamble 810. In this manner, the channel estimation component 500 is able to synchronise with the received signal 405 and to initially generate (unvalidated) channel estimate information 525 using the synchronisation symbols 812 within the first part of the preamble 810.

For the example illustrated in FIG. 11, the validation component 1110 comprises a code generator component 1110 arranged to receive the validation pattern reference 532 for the packet being received and to generate a validation pattern based on the received validation pattern reference 532. A sequence detector component 1120 is arranged to detect when a validation sequence 820 within a packet being received, for example upon detection of the SFD 814 within the packet structure 800 illustrated in FIG. 8. The sequence detection component 1120 may then instruct the code generator component 1110 to reconfigure the correlation coefficients for the symbol correlator 510 to cause the symbol correlator 510 to perform cross-correlation between the validation sequence within the received packet and the generated validation pattern. The sequence detection component 1120 may also reset the accumulator circuits 520, or cause their respective adder units to be bypassed for an initial channel estimation period, upon detection of the validation sequence 820. In this manner, the channel estimate is reconfigured to generate validated channel estimate information 1125 based on the cross-correlation between the validation sequence within the packet and the generated validation pattern performed by the symbol correlator 510. The validated channel estimation information 1125 may then be output to the timestamping module 420.

In some embodiments, and as illustrated in FIG. 11, the validation component 1130 may further include a validator component 1170 arranged to receive the unvalidated and validated channel estimation information 1125 output by the channel estimation component 500. The validator component 1170 may then perform a comparison of the unvalidated channel estimate information 525 to the validated channel estimate information 1125, and determine whether the (initially) unvalidated channel estimate information 525 is valid. The validator component 1170 may then output to the timestamping module 420 an indication of whether the (initially) unvalidated channel estimate information 525 is valid, such an indication forming a part of the channel estimate information 415 (FIG. 4) provided to the timestamp module 420.

Figure 12:
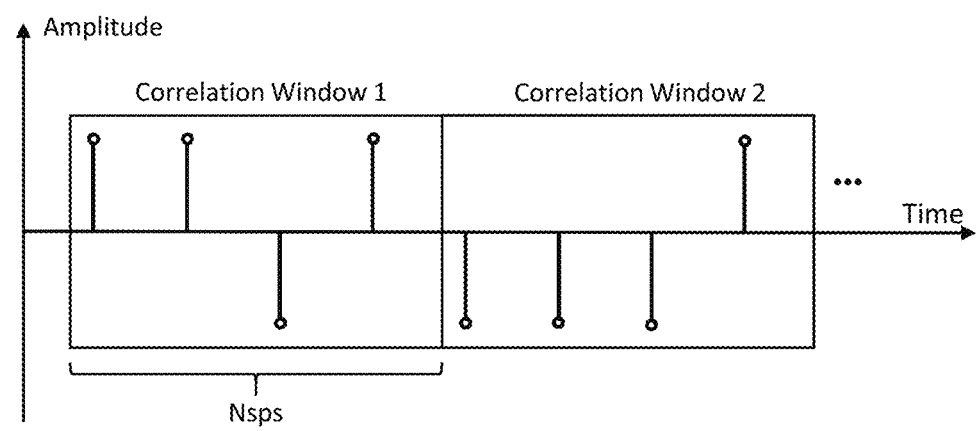
FIG. 12 illustrates an example of segmentation of a validation pattern.

In the example illustrated in FIG. 11, all channel estimate taps are validated with the coefficients of the symbol correlator 510 of the channel estimation component 500 being re-configured every time a sample of the received packet has gone through all (Nsps) taps of the correlator delay line. If the validation pattern exceeds the correlation window for all (Nsps) taps of the correlator delay line, the validation pattern may be divided into correlation segments, with the length of each segment being the same as the correlation window for all (Nsps) taps of the correlator delay line, such as illustrated in FIG. 12.

Figure 13:
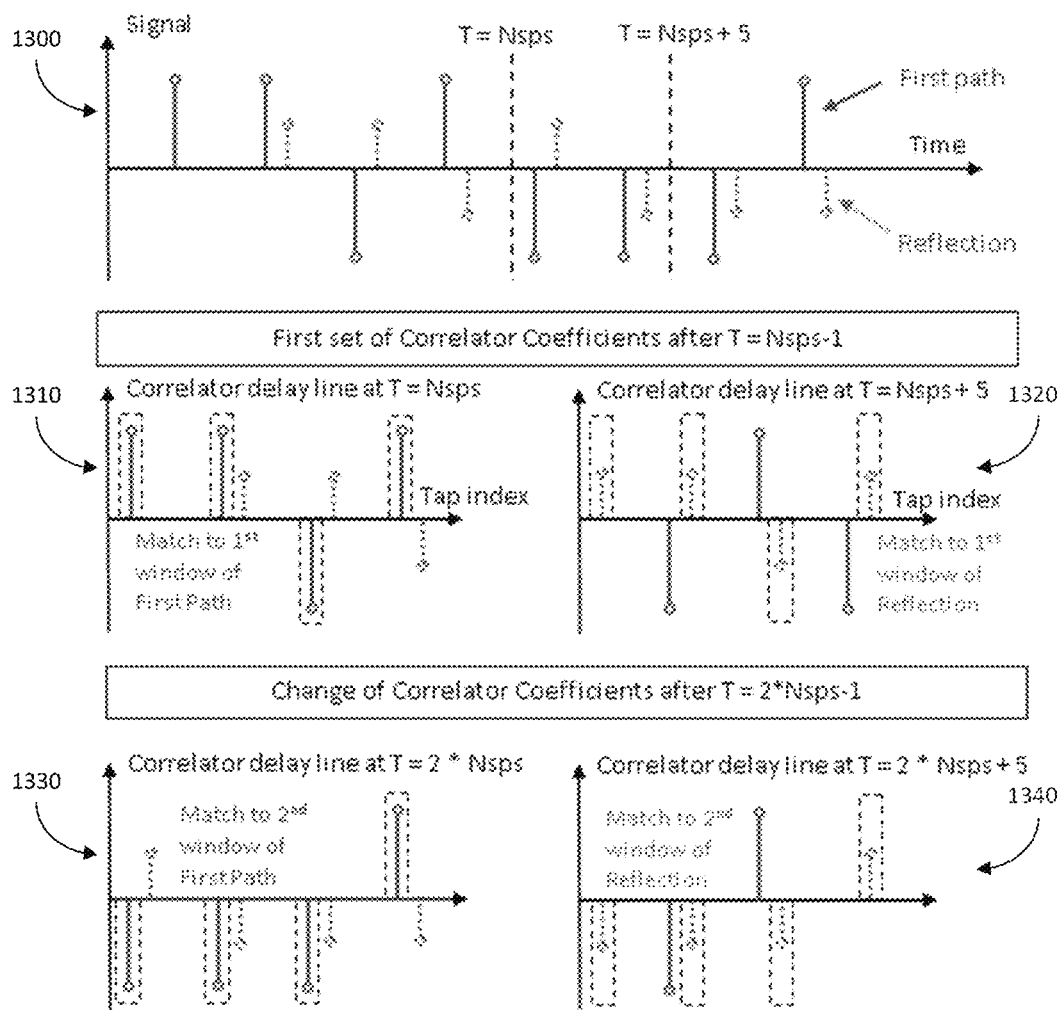
FIG. 13 illustrates an example of how symbol correlator coefficients may be reconfigured for a segmented validation pattern.

FIG. 13 illustrates an example of how the coefficients for the symbol correlator 510 may be reconfigured for such segmented validation pattern. The validation sequence within a first path and a second (reflection) path are illustrated at 1300, with the second path being received five samples later than the first path.

A first set of symbol correlator coefficients corresponding to a first correlation segment of the validation pattern configured for a correlator delay line of the symbol correlator 510 at $T=N_{sps}$ and for a correlator delay line at $T=N_{sps}+5$ are illustrated at 1310 and 1320 respectively. As illustrated in FIG. 13, a first part of the validation sequence within the first path matches the first correlation segment of the validation pattern configured for the correlator delay line at $T=N_{sps}$ 1310, whilst the first part of the validation sequence within the second path matches the first correlation segment of the validation pattern configured for the correlator delay line at $T=N_{sps}+5$ 1320, A second set of symbol correlator coefficients corresponding to a second correlation segment of the validation pattern configured for the correlator delay line of the symbol correlator 510 at $T=2*N_{sps}$ and for the correlator delay line at $T=2*N_{sps}+5$ are illustrated at 1330 and 1340 respectively. As illustrated in FIG. 13, a second part of the validation sequence within the first path matches the second correlation segment of the validation pattern configured for the correlator delay line at $T=2*N_{sps}$ 1330, whilst the second part of the validation sequence within the second path matches the second correlation segment of the validation pattern configured for the correlator delay line at $T=2*N_{sps}+5$ 1340, For the example illustrated in FIG. 11, initial (unvalidated) channel estimate information accumulated within the accumulator circuits 520 is lost when the accumulator circuits 520 are reset in order to accumulate validated channel estimate information from the validation sequence. For alternative embodiments it is contemplated that each accumulator circuit 520 may be provided with additional memory for storing both the initial (unvalidated) channel estimate and the subsequent (validated) channel estimate, or to split the memory originally used by the initial (unvalidated) channel estimate into two parts after the unvalidated channel estimate has been generated.

Advantageously, for each of the example embodiments hereinbefore described, protection is provided against cicada and (a)synchronous preamble injection attacks. This is achieved by using validation sequence(s) to derive the validated channel estimate information, whereby the validation sequences are resilient to the random pulses of cicada attacks, and prevent an attacker from synchronising to the legitimate signal and transmitting repetitive preamble symbols.

The resulting, validated channel estimate information for the validation sequence(s) may either be used as a stand-alone result or in addition it can be used to validate channel estimate information which was generated by the known synchronization sequence up-front. In this manner, attacks may not only be mitigated, but also be detected. To reduce hardware effort further, the validation sequence(s) may only be used for validation of already determined channel estimate taps (especially the first path) of a known, non-secure synchronization sequence.

An example of a packet structure containing a validation sequence has been illustrated in, and hereinbefore described in relation to, FIG. 8. In this particular example, the validation sequence 820 is provided after the synchronisation symbols 812 within the preamble 810 of the packet.

Figure 14:
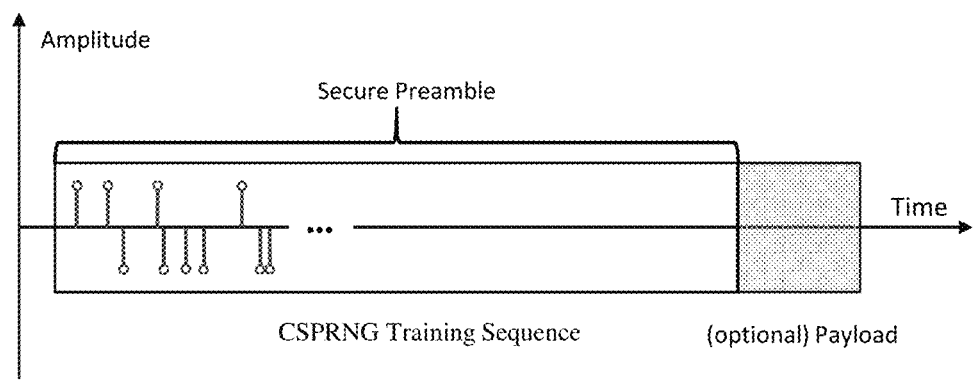
FIG. 14 illustrates an alternative example of a packet structure comprising a validation sequence.

FIG. 14 illustrates an alternative example of a packet structure comprising a validation sequence. In the example illustrated in FIG. 14, the validation sequence has been used to replace the preamble of the packet. Since the synchronization sequence from the preamble has been removed, synchronization either needs to be performed using the validation sequence or preceding packets. The lack of repeatable symbols within the validation sequence makes synchronization using the validation sequence difficult and may lead to either a reduced link budged or an increased hardware effort (e.g. longer correlation) in the receiver device. Thus in practice, a synchronization based on preceding, non-secure frames is preferred for such a packet structure. However, this would require accurate timing of the successive packets.

Figure 15:
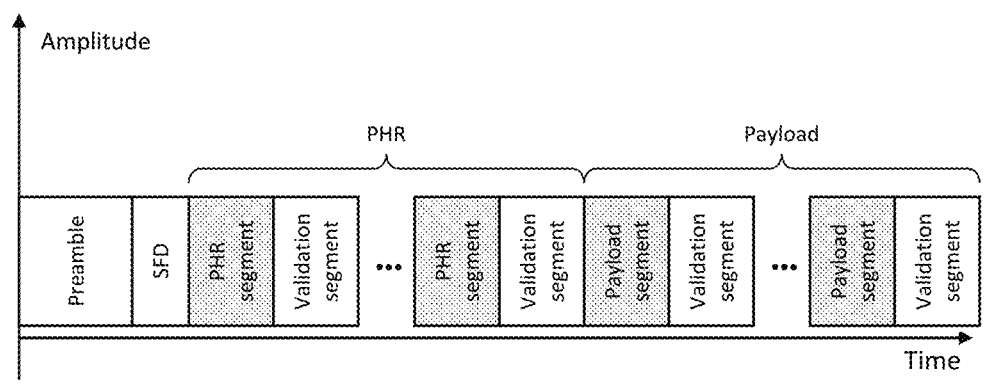
FIG. 15 illustrates a further alternative example of a packet structure comprising a validation sequence.

FIG. 15 illustrates a further alternative example of a packet structure comprising a validation sequence. In the example illustrated in FIG. 15, the validation sequence is time-multiplexed with the payload. In this manner, the validation sequence is distributed within time-multiplexed segments within the payload of the packet. Additionally/alternatively, the validation sequence may comprise segments interleaved with payload segments in accordance with a validation code interleaving sequence.

Referring back to FIG. 3, in the transmit direction the baseband processing module of the communication device 300 may be arranged to transmit a signal to a receiver device comprising a packet for which a ToA measurement is to be determined. Accordingly, the baseband processor module 340 may be arranged to derive a validation pattern for the packet for which a ToA measurement is to be determined, identify a section of the packet to contain a validation sequence, and generate the packet comprising the validation sequence corresponding to the derived validation pattern. In particular the baseband processor module 340 may be arranged to generate a packet comprising a validation sequence for use in generating channel estimate validation information has hereinbefore described in relation the receive direction of the baseband processor module 340.

Figure 16:
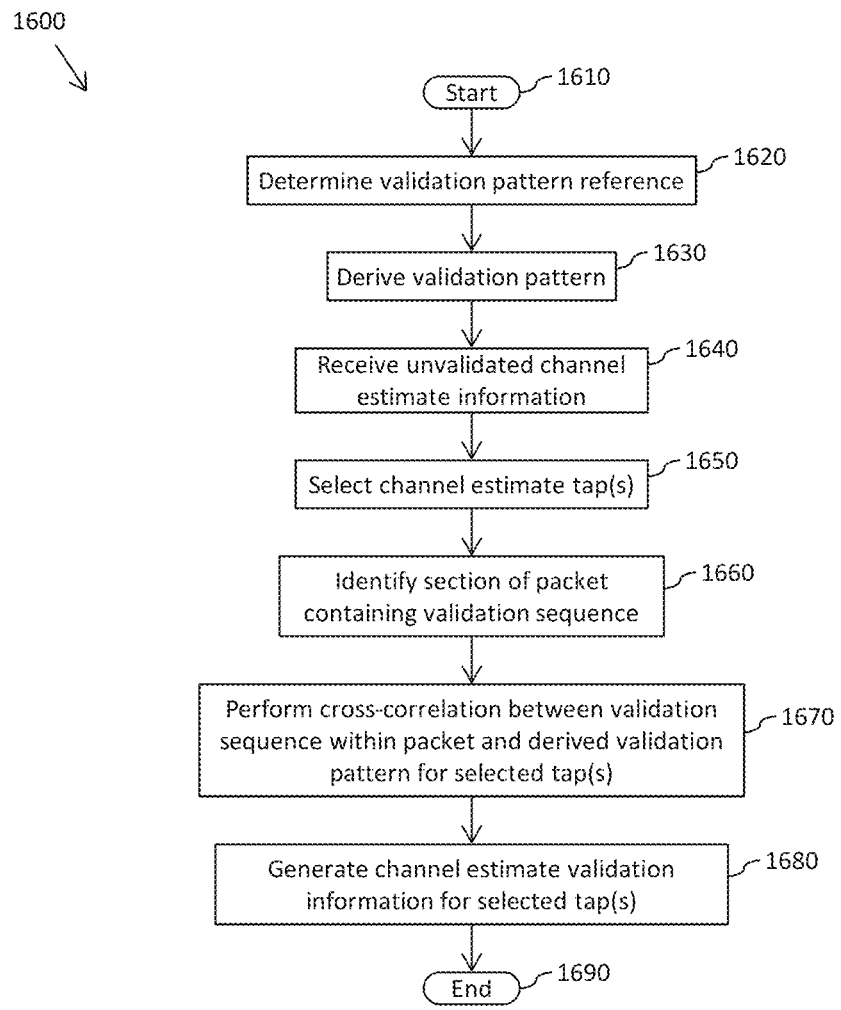
FIG. 16 illustrates a simplified flowchart of an example of a method of estimation of a propagation channel model.

Referring now to FIG. 16, there is illustrated a simplified flowchart 1600 of an example of a method of estimation of a propagation channel model within a communication receiver device for determining a Time-of-Arrival, ToA, measurement for a packet within a received signal, such as may be implemented within the channel estimate generation component 410 illustrated in FIG. 5. The method starts at 1610, and moves on to 1620 where a validation pattern reference is determined, for example by way of a challenge/response scheme between the legitimate transmitter and receiver devices. A validation pattern is then derived at 1630 based on the validation pattern reference. For example, the validation pattern reference may comprise a seed value and the validation pattern is generated by a CSPRNG using the validation pattern reference. Unvalidated channel estimate information for the transmission channel of a received packet is then received, at 1640, and one or more channel estimate taps are selected based on the received unvalidated channel estimate information, at 1650. A section of the received packet containing a validation sequence is identified at 1660, and cross-correlation between the validation sequence within the packet and the derived validation pattern is performed at 1670. Channel estimate validation information for the selected tap(s) is then generated at 1680 based on the performed cross-correlation. For example, the channel estimate validation information may be generated based on a comparison of the validated and unvalidated channel estimate information for the selected tap(s). The method then ends, at 1690.

Figure 17:
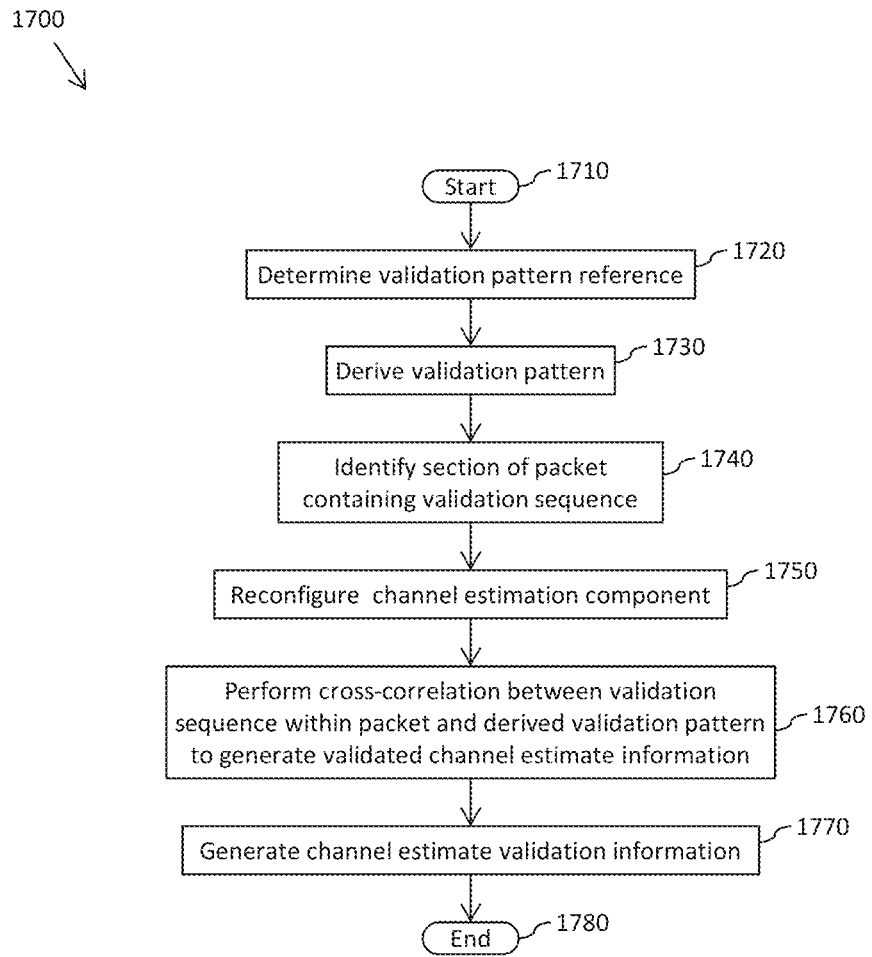
FIG. 17 illustrates a simplified flowchart of an alternative example of a method of estimation of a propagation channel model.

Referring now to FIG. 17, there is illustrated a simplified flowchart 1700 of an example of a method of estimation of a propagation channel model within a communication receiver device for determining a Time-of-Arrival, ToA, measurement for a packet within a received signal, such as may be implemented within the channel estimate generation component 410 illustrated in FIG. 11. The method starts at 1710, and moves on to 1720 where a validation pattern reference is determined, for example by way of a challenge/response scheme between the legitimate transmitter and receiver devices. A validation pattern is then derived at 1730 based on the validation pattern reference. For example, the validation pattern reference may comprise a seed value and the validation pattern is generated by a CSPRNG using the validation pattern reference. A section of a received packet containing a validation sequence is identified at 1740. A channel estimation component is then reconfigured to perform cross-correlation between the validation sequence within the received packet and the generated validation pattern, for example, and as illustrated in FIG. 11, by reconfiguring the correlation coefficients for a symbol correlator 510 of the channel estimation component 500. Cross-correlation between the validation sequence within the packet and the derived validation pattern is then performed at 1760, and validated channel estimate information is then generated at 1770 based on the performed cross-correlation. The method then ends, at 1780.

Because the illustrated embodiments may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific examples of embodiments. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the example illustrated in FIG. 5, the sequence detector and code generator 535 has been illustrated and described as a single logical block. However, it will be appreciated that the sequence detection and code generation functions may be implemented in separate functional blocks.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A baseband processor for a communication receiver arranged to receive a signal transmitted by a transmitter; the baseband processor comprising:
    a channel estimate generator configured to output channel estimate information for the received signal; and
    a timestamping device configured to determine a Time-of-Arrival, ToA, measurement for a packet within the received signal based at least partly on the channel estimate information for the received signal generated by the channel estimate generator; wherein the channel estimate generator is configured to derive a validation pattern based at least partly on a validation pattern reference known by both the communication receiver and the transmitter for the packet within the received signal for which a ToA measurement is to be determined, identify a section of the packet containing a validation sequence, and perform cross-correlation between at least a part of the validation sequence within the packet and at least a part of the derived validation pattern to generate channel estimate validation information, and mitigate and detect ToA attacks based upon the validation sequence.

2. The baseband processor of claim 1, wherein the channel estimate generator is configured to receive unvalidated channel estimate information for the received signal, select at least one channel estimate tap for which channel estimate validation information is to be generated based on the unvalidated channel estimate information, and perform cross-correlation between at least a part of the validation sequence within the packet and at least a part of the derived validation pattern to generate channel estimate validation information for the at least one selected channel estimate tap.

3. The baseband processor of claim 2, wherein the channel estimate generator is further configured to determine whether the unvalidated channel estimate information for the at least one selected channel estimate tap is valid based at least partly on the generated channel estimate validation information for the at least one selected channel estimate tap, and to output to the timestamping device an indication of whether the generated channel estimate information for the at least one selected channel estimate tap is valid based on said determination.

4. The baseband processor of claim 2, wherein the channel estimate generator is further configured to replace unvalidated channel estimate information for the at least one selected channel estimate tap with validated channel estimate tap values for the at least one selected tap and to output validated channel estimate information to the timestamping device comprising the validated channel estimate tap values for the at least one selected tap.

5. The baseband processor of claim 1, wherein the channel estimate generator further comprises:

a symbol correlator configured to perform cross-correlation of the received signal with a reference pattern and to output a resulting correlation signal from which the channel estimate generator is configured to generate channel estimate information and reconfigure the symbol correlator to perform cross-correlation between the validation sequence within the packet within the received signal and the generated validation pattern.

6. The baseband processor of claim 1, wherein the channel estimate generator is configured to generate a non-repeating symbol validation pattern.

7. The baseband processor of claim 1, wherein the channel estimate generator is configured to derive the validation pattern based on at least one of a pseudo random number generator function, a cryptographically secure pseudo random number generator function, a hash function, and a secure hash function.

8. The baseband processor of claim 1, wherein the channel estimate generator is configured to derive the validation pattern comprising at least one of a validation code pattern, a validation code position pattern, and a validation code interleaving sequence.

9. The baseband processor of claim 1, wherein the section of the packet containing the validation sequence comprises at least one of a preamble of the packet, a part of a preamble of the packet, time-multiplexed segments within a payload of the packet, and segments interleaved with payload segments.

10. A communication receiver configured to receive a signal transmitted by a transmitter; the communication receiver comprising at least one baseband processor according to claim 1.

11. The communication receiver of claim 10, wherein the communication receiver comprises at least one of an Impulse Radio Ultra-WideBand receiver, a light/laser ranging receiver and a sound-based ranging receiver.

12. A baseband processor for a communication transmitter configured to transmit a signal to a receiver device comprising a packet for which a Time-of-Arrival, ToA, measurement is to be determined; the baseband processor being configured to derive a validation pattern based at least partly on a validation pattern reference known by both the communication transmitter and a corresponding receiver for the packet for which a ToA measurement is to be determined, identify a section of the packet to contain a validation sequence, generate the packet comprising the validation sequence corresponding to the derived validation pattern, and mitigate and detect ToA attacks based upon the validation sequence.

13. A communication transmitter configured to transmit a signal to a receiver; the communication transmitter comprising at least one baseband processor according to claim 12.

14. The communication transmitter of claim 13, wherein the communication transmitter comprises at least one of an Impulse Radio Ultra-WideBand transmitter device; a light/laser ranging transmitter device; and a sound-based ranging transmitter device.

15. A method for generating channel estimate information within a communication receiver for determining a Time-of-Arrival, ToA, measurement for a packet within a received signal; the method comprising:
    deriving a validation pattern based at least partly on a validation pattern reference known by both the communication receiver and a corresponding transmitter for the packet within the received signal for which a ToA measurement is to be determined;

identifying a section of the packet containing a validation sequence; and performing cross-correlation between at least a part of the validation sequence within the packet and at least a part of the derived validation pattern to generate channel estimate validation information; and mitigate and detect ToA attacks based upon the validation sequence.

\* \* \* \* \*